(12) United States Patent
Uehara

(10) Patent No.: US 12,017,418 B2
(45) Date of Patent: Jun. 25, 2024

(54) METHOD FOR MOLDING COMPOSITE MATERIAL, AND COMPOSITE MATERIAL

(71) Applicant: Nissan Motor Co., Ltd., Yokohama (JP)

(72) Inventor: Shigetaka Uehara, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 24 days.

(21) Appl. No.: 16/332,819

(22) PCT Filed: Sep. 14, 2016

(86) PCT No.: PCT/JP2016/077193
§ 371 (c)(1),
(2) Date: Mar. 13, 2019

(87) PCT Pub. No.: WO2018/051445
PCT Pub. Date: Mar. 22, 2018

(65) Prior Publication Data
US 2019/0202142 A1    Jul. 4, 2019

(51) Int. Cl.
*B29C 70/20*    (2006.01)
*B29C 43/20*    (2006.01)
(Continued)

(52) U.S. Cl.
CPC ............. *B29C 70/20* (2013.01); *B29C 43/20* (2013.01); *B29C 70/16* (2013.01); *B32B 5/024* (2013.01);
(Continued)

(58) Field of Classification Search
CPC ....... Y10T 442/30–3992; Y10T 442/20–2992; Y10T 428/249933–249952;
(Continued)

(56) References Cited

U.S. PATENT DOCUMENTS 6,117,551 A * 9/2000 Nagata .................. B29B 15/105
156/230
6,311,542 B1 * 11/2001 Sloman .................. B29C 70/08
156/245
(Continued)

FOREIGN PATENT DOCUMENTS

CN        104215130 A    12/2014
CN        104602904 A    5/2015
(Continued)

*Primary Examiner* — Marla D McConnell
*Assistant Examiner* — Kevin Worrell
(74) *Attorney, Agent, or Firm* — Global IP Counselors, LLP

(57) ABSTRACT

A molding method is provided for manufacturing a composite material having a base layer formed of at least one first prepreg sheet and a second prepreg sheet stacked on at least a portion of the first prepreg sheet. The first prepreg sheet and the second prepreg sheet are stacked, and then heated and cured. The second prepreg sheet constitutes a front surface layer that is integrally formed on the surface of the base layer. Here, the amount of second resin in the second prepreg sheet is larger than the amount of first resin in the first prepreg sheet on a per unit volume basis in an interface between the first prepreg sheet and the second prepreg sheet when the second prepreg sheet is stacked on the first prepreg sheet.

18 Claims, 6 Drawing Sheets

(51) Int. Cl.
*B29C 70/16* (2006.01)
*B29K 101/10* (2006.01)
*B29K 101/12* (2006.01)
*B29K 307/04* (2006.01)
*B29K 309/08* (2006.01)
*B32B 5/02* (2006.01)
*B32B 5/26* (2006.01)
*B32B 5/28* (2006.01)

(52) U.S. Cl.
CPC ............... *B32B 5/26* (2013.01); *B32B 5/28* (2013.01); *B29K 2101/10* (2013.01); *B29K 2101/12* (2013.01); *B29K 2307/04* (2013.01); *B29K 2309/08* (2013.01); *B32B 2262/101* (2013.01); *B32B 2262/106* (2013.01)

(58) Field of Classification Search
CPC .. D03D 1/00–08; D03D 3/00–08; D03D 5/00; D03D 7/00; D03D 9/00; D03D 11/00–02; D03D 13/00–008; D03D 15/00–12; D03D 17/00; D03D 19/00; D03D 21/00; D03D 23/00; D03D 25/00–005; D03D 27/00–18; D03D 2700/00–90; B29C 66/7392; B29C 66/7394; B29C 70/08–083; B29C 70/06–24; B29B 11/04; B29B 11/16
USPC .......... 442/181–303, 59–180; 264/642–643, 264/134–137
See application file for complete search history.

(56) References Cited

U.S. PATENT DOCUMENTS

| | | | |
|---|---|---|---|
| 2006/0110599 A1* | 5/2006 | Honma | B29C 66/73752 428/413 |
| 2008/0166511 A1* | 7/2008 | Honma | C08G 59/5033 428/297.4 |
| 2015/0239200 A1* | 8/2015 | Bartolome | B32B 5/02 428/118 |
| 2016/0176176 A1 | 6/2016 | Liou et al. | |
| 2017/0151712 A1* | 6/2017 | La Forest | B29C 64/393 |

FOREIGN PATENT DOCUMENTS

| | | | |
|---|---|---|---|
| CN | 104669725 A | | 6/2015 |
| CN | 105799246 A | | 7/2016 |
| JP | 56-115227 U1 | | 9/1981 |
| JP | S56-115227 U | | 9/1981 |
| JP | 5-65357 A | | 3/1993 |
| JP | H05-147145 A | | 6/1993 |
| JP | 7-88868 A | | 4/1995 |
| JP | 2005176653 A | * | 7/2005 |
| JP | 2010-221489 A | | 10/2010 |
| JP | 2011006578 A | * | 1/2011 |
| JP | 2015-120354 A | | 7/2015 |
| WO | 2006/089534 A1 | | 8/2006 |

* cited by examiner

METHOD FOR MOLDING COMPOSITE MATERIAL, AND COMPOSITE MATERIAL

CROSS-REFERENCE TO RELATED APPLICATIONS

This application is a U.S. national stage application of International Application No. PCT/JP20161077193, filed on Sep. 14, 2016.

BACKGROUND

Technical Field

The present invention relates to a molding method for composite materials and a composite material.

Background Information

In recent years, composite materials made by impregnating a reinforcing base material with resin have been used as automobile parts to reduce automobile body weight. Particularly among automobile parts, outer panel components such as roofs and hoods are required to have high appearance quality.

When molding composite materials in which a resin is cured and shrinks, fine irregularities may form on the surface due to a difference in a shrinkage ratio between the resin and a reinforcing base material. The fine irregularities on the surface cause deterioration in the appearance quality after painting.

For example, a method disclosed in Japanese Laid Open Patent Application No. 2010-221489 (Patent Document 1) is known as a method for eliminating the irregularities on the surface of the composite material. According to this method, a dry base material in which a reinforcing base material is not impregnated with resin is used as an intermediate layer, and this intermediate layer is sandwiched between prepreg sheets in which a reinforcing base material is impregnated with resin, after which resin is injected to carry out RTM molding. Attempts have been made to eliminate surface irregularities by preventing the resin in the prepreg sheets from flowing out from the prepreg sheets toward the intermediate layer, when the resin with which the intermediate layer is impregnated is cured and shrinks.

SUMMARY

However, in the method according to Patent Document 1, since the temperature of the metal mold is high in order to carry out molding, when a material is placed in the metal mold, the resin immediately starts to melt. Because the intermediate layer is a dry base material that is not impregnated with resin, the resin with which the prepreg sheets of the surface layers are impregnated immediately melts and starts to flow toward the intermediate layer. The flow of the resin causes disturbance in the reinforcing fibers. As a result, internal voids as well as wrinkles and kinks of the fibers occur, which may cause a deterioration in the appearance quality of the composite material.

Moreover, in the method according to Patent Document 1, use of the RTM molding method is assumed. In the RTM molding method, the resin is injected into the metal mold from an injection gate, so there is already a flow of resin; therefore, the method likely causes the disturbance in the reinforcing fibers.

In order to solve the problem described above, an object of the present invention is to provide a molding method for a composite material and a composite material with which it is possible to eliminate irregularities on the surface of the composite material to improve the appearance quality.

In the molding method for a composite material according to the present invention, which achieves the object described above, first, a first reinforcing base material is impregnated with a first resin to prepare a first prepreg sheet that constitutes a base layer, and a second reinforcing base material is impregnated with a second resin to prepare a second prepreg sheet that constitutes a front surface layer. Here, when the second prepreg sheet is stacked on the first prepreg sheet, the amount of the second resin in the second prepreg sheet is larger than the amount of the first resin in the first prepreg sheet, per unit volume, including the interface between the first prepreg sheet and the second prepreg sheet. Then, the second prepreg sheet is stacked on at least a portion of the surface of the first prepreg sheet, and the first prepreg sheet and the second prepreg sheet, which are stacked, are heated and cured. The front surface layer defined by the second prepreg sheet is thereby integrally formed on a surface of the base layer defined by the first prepreg sheet.

In addition, the composite material according to the present invention, which achieves the object described above, comprises a base layer including a first reinforcing base material and a first resin, and a front surface layer including a second reinforcing base material and a second resin, integrally formed on at least a portion of the surface of the base layer. Here, the amount of the second resin in the front surface layer is larger than the amount of the first resin in the base layer, per unit volume, including the interface between the base layer and the front surface layer.

DETAILED DESCRIPTION OF THE EMBODIMENTS

Figure 1A:
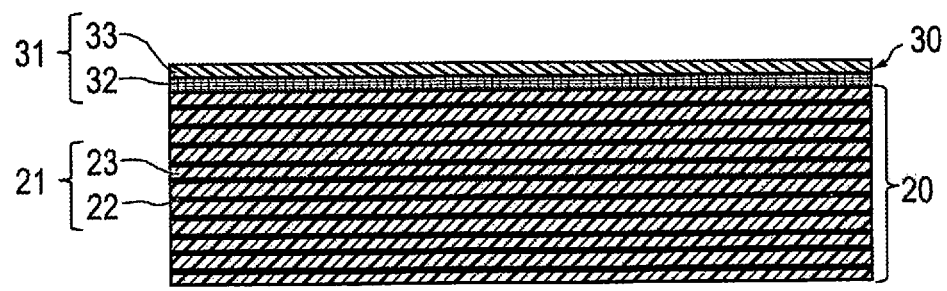
FIG. 1A is a schematic cross-sectional view illustrating a configuration of a composite material according to the present embodiment.

Embodiments of the present invention will be explained below with reference to the appended drawings. The description below does not limit the technical scopes or the meanings of the terms described in the Claims. Dimensional ratios in the drawings are exaggerated for the sake of convenience of explanation and may differ from actual ratios.

Figure 9A:
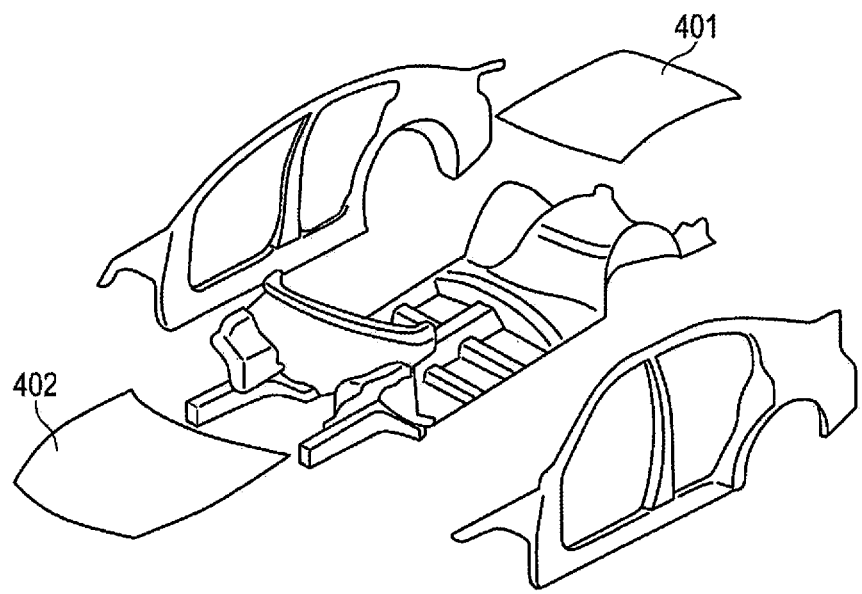
FIG. 9A is a view illustrating application examples of composite material that is molded by means of the molding method in accordance with the embodiment, and a view illustrating various automobile parts that use the composite material.
Figure 9B:
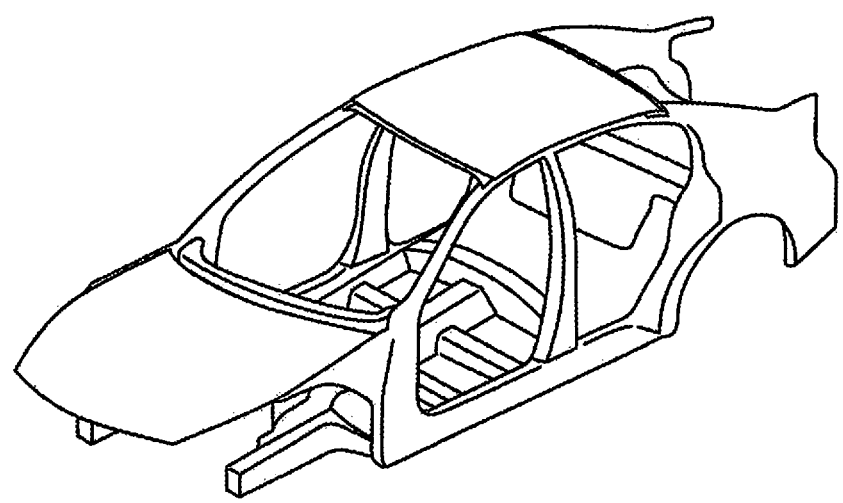
FIG. 9B is a view illustrating application examples of composite material that is molded by means of the molding method in accordance with the embodiment, and a view illustrating a vehicle body that is formed by joining the various automobile parts that use the composite material.

As is well known, a composite material has a reinforcing base material and a resin. The composite material is provided with a greater strength than resin alone by combining the resin with the reinforcing base material. The composite material is applied to outer panel components such as a roof 401 and a hood 402 of an automobile vehicle body 400, as illustrated in FIGS. 9A and 9B. By means of applying the composite material, a greater reduction in the weight of the vehicle body 400 becomes possible as compared to a case in which a steel material is used.

In general, a composite material 10 according to the present embodiment comprises a base layer 20 including a first reinforcing base material 22 and a first resin 23, and a front surface layer 30 including a second reinforcing base material 32 and a second resin 33, integrally formed on at least a portion of the surface of the base layer 20, as illustrated in FIGS. 1A, 1B, 1C and 2. In this composite material 10, an interface 40 between the base layer 20 and the front surface layer 30 is set so that an amount of the second resin 33 in the front surface layer 30 per unit volume V2 is larger than an amount of the first resin 23 in the base layer 20 per unit volume V1 (V1=V2).

The base layer 20 comprises a first prepreg sheet 21 in which the first reinforcing base material 22 is impregnated with the first resin 23. The front surface layer 30 comprises a second prepreg sheet 31 in which the second reinforcing base material 32 is impregnated with the second resin 33. Here, when the second prepreg sheet 31 is stacked on the first prepreg sheet 21, the interface 40 between the first prepreg sheet 21 and the second prepreg sheet 31 is set so that the amount of the second resin 33 in the second prepreg sheet 31 per unit volume V2 is larger than the amount of the first resin 23 in the first prepreg sheet 21 per unit volume V1 (V1=V2). The first resin 23 in the first prepreg sheet 21 is in an uncured or semi-cured state. Similarly, the second resin 33 in the second prepreg sheet 31 is in an uncured or semi-cured state. The second prepreg sheet 31 is stacked on at least a portion of the surface of the first prepreg sheet 21, and the first prepreg sheet 21 and the second prepreg sheet 31, which are stacked, are heated and cured. The composite material 10 is formed by integrating the front surface layer 30 on the surface of the base layer 20. In the illustrated example, the base layer 20 is formed by stacking a plurality of the first prepreg sheets 21, and the front surface layer 30 is formed by one of the second prepreg sheets 31. In the following description, the first resin 23 is referred to as the "base material resin 23" and the second resin 33 is referred to as the "coating resin 33."

Figure 2:
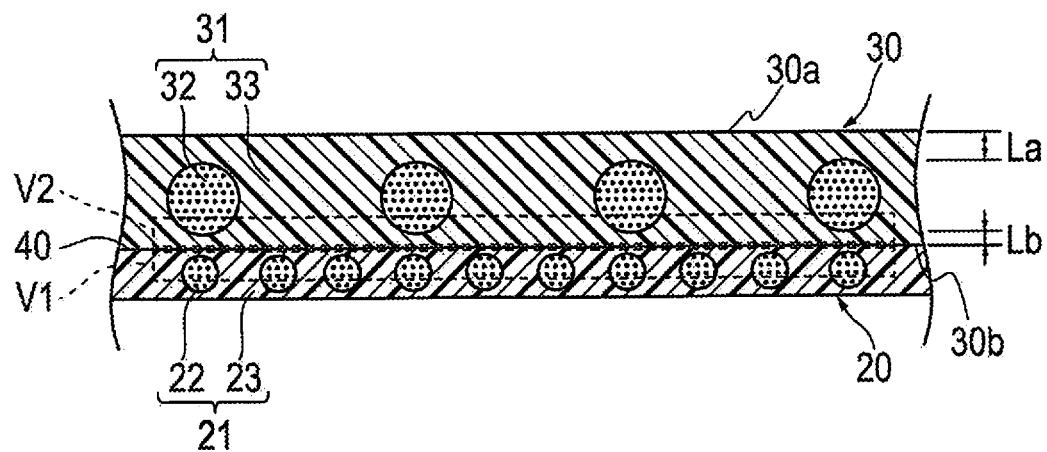
FIG. 2 is a cross-sectional view illustrating a main part of a composite material.

Referring to FIG. 2, the coating resin 33 of the front surface layer 30 is present in the interface 40 within a range that is larger than a range in which the base material resin 23 of the base layer 20 is present in the interface 40 with respect to a cross section in which the base layer 20 and the front surface layer 30 are stacked. Focusing on the rectangular ranges indicated by the broken line, showing the unit volumes V1, V2, the area occupied by the coating resin 33 is greater than the area occupied by the base material resin 23. If the cross section of the stacked base layer 20 and the front surface layer 30 is in such a state, it is possible to say that "the amount of the coating resin 33 in the front surface layer 30 is larger than the amount of the base material resin 23 in the base layer 20 per unit volume V1, V2 in the interface 40 between the base layer 20 and the front surface layer 30" as described above. Moreover, as concerns the second prepreg sheet 31 before molding, it can be said that "when stacked on the first prepreg sheet 21, the amount of the coating resin 33 in the second prepreg sheet 31 is larger than the amount of the base material resin 23 in the first prepreg sheet 21 per unit volume V1, V2 in the interface 40 between the first prepreg sheet 21 and the second prepreg sheet 31," as described above.

The reinforcing base material that is applied to the composite material 10 can be formed from, for example, carbon fiber, glass fiber, aramid fiber, polyamide (PA) fiber, polypropylene (PP) fiber, and acrylic fiber.

In the present embodiment, an example will be described in which long carbon fibers are used as the first reinforcing base material 22. Carbon fiber is characterized by a low coefficient of thermal expansion, excellent dimensional stability, and little degradation of mechanical properties even at high temperatures, and thus is suitably used as the first reinforcing base material 22 of the composite material 10 for an automobile vehicle body 400 (refer to FIG. 9B).

An example will be described in which glass fiber is used as the second reinforcing base material 32.

Figure 6A:
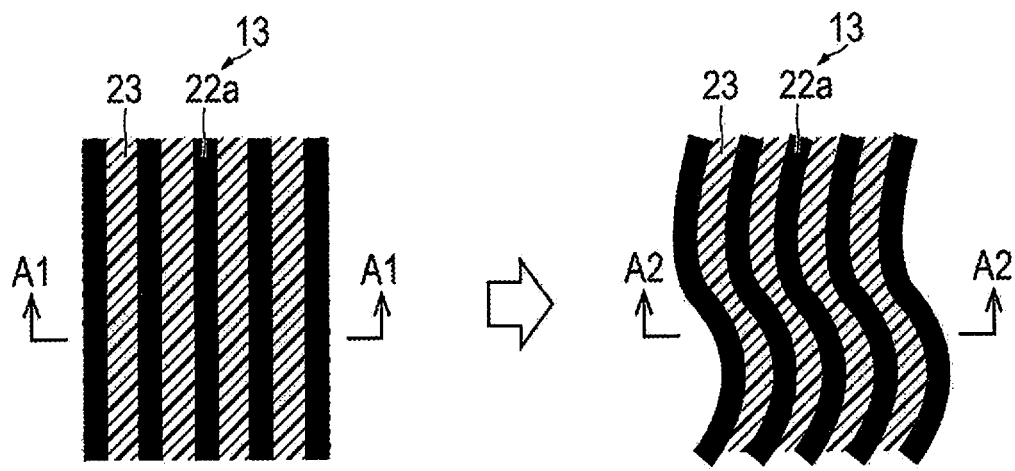
FIG. 6A is a view illustrating a state in which the composite material is molded, and a schematic view illustrating before (left-hand) and after (right-hand) the resin is cured when molding a composite material having a unidirectional material as the outermost layer.

It is possible to use a woven fabric material 12 obtained by weaving fabrics vertically and horizontally into a plain weave or a twill weave (refer to FIG. 8A), or a unidirectional material 13 in which fibers are aligned in one direction (refer to the left-hand drawing in FIG. 6A) as the first reinforcing base material 22 that is applied to the first prepreg sheet 21 and the second reinforcing base material 32 that is applied to the second prepreg sheet 31.

Figure 1B:
FIG. 1B is a schematic cross-sectional view illustrating the configuration of a first prepreg sheet.
Figure 1C:
FIG. 1C is a schematic cross-sectional view illustrating the configuration of a second prepreg sheet.

In the present embodiment, the unidirectional material 13 is used as the first reinforcing base material 22, as illustrated in FIGS. 1A and 1B. In addition, a woven fabric material 12 in which fibers are woven is used as the second reinforcing base material 32, as illustrated in FIGS. 1A and 1C. The second prepreg sheet 31 including the second reinforcing base material 32, which is the woven fabric material 12, presses against the first prepreg sheet 21 including the first reinforcing base material 22 at the time of molding.

A thermosetting resin or a thermoplastic resin is used as the base material resin 23, in accordance with the desired material properties. Similarly, a thermosetting resin or a thermoplastic resin is used as the coating resin 33, in accordance with the desired material properties.

In the present embodiment, a thermosetting resin such as epoxy resin, phenol resin, or the like, is used as the base material resin 23. In the present embodiment, an epoxy resin that has excellent mechanical properties and dimensional stability is used. The epoxy resin typically used is a two-component type, which is used by mixing a main agent and a curing agent. Generally, a bisphenol A type epoxy resin is used as the main agent and an amine type is used as the curing agent, but no limitation is imposed thereby, and the agents may be appropriately selected according to the desired material properties.

In the present embodiment, a thermoplastic resin such as polypropylene (PP) resin, ABS resin, or the like, is used as the coating resin 33.

In general, thermoplastic resin has superior impact resistance compared to thermosetting resin. Chipping occurs in the outer panel components for automobiles, which is damage caused by an impact from a flying stone that is thrown up while the automobile is traveling. Due to the superior impact resistance, as compared to a composite material in which the front surface layer is formed of a thermosetting resin, it is possible to reduce the damage caused by chipping. Additionally, since the thermoplastic resin also suppresses crack propagation better than the thermosetting resin, it is possible to suppress the deterioration in the appearance quality when used for a long period of time.

Regarding the front surface layer 30, the amount of the coating resin 33 in the region between the surface 30a and the second reinforcing base material 32 that faces the surface 30a is larger than the amount of the coating resin 33 in the region between the interface 40 with the base layer 20 and the second reinforcing base material 32 that faces the interface 40.

Referring to FIG. 2, an average distance La from the surface 30a to the second reinforcing base material 32 that faces the surface 30a is greater than an average distance Lb from the interface 40 to the second reinforcing base material 32 that faces the interface 40 with respect to the cross section of the front surface layer 30. If the cross section of the front surface layer 30 is in such a state, it can be said that "the amount of the coating resin 33 in the region between the surface 30a and the second reinforcing base material 32 that faces the surface 30a is larger than the amount of the coating resin 33 in the region between the interface 40 with the base layer 20 and the second reinforcing base material 32 that faces the interface 40," as described above. Furthermore, regarding the second prepreg sheet 31 before molding, it can be said that "the amount of the coating resin 33 in the region between the outermost surface 30a and the second reinforcing base material 32 is larger than the amount of the coating resin 33 in the region between a rear surface 30b of the second prepreg sheet 31 and the second reinforcing base material 32," as described above.

Since the front surface layer 30 is not a layer that contributes to the product strength, it is possible to create a state in which the resin content on the surface 30a side of the second prepreg sheet 31 is relatively high, that is, a so-called resin-rich state, by appropriately adjusting the amount of the coating resin 33 in the region between the outermost surface 30a and the second reinforcing base material 32.

Figure 3:
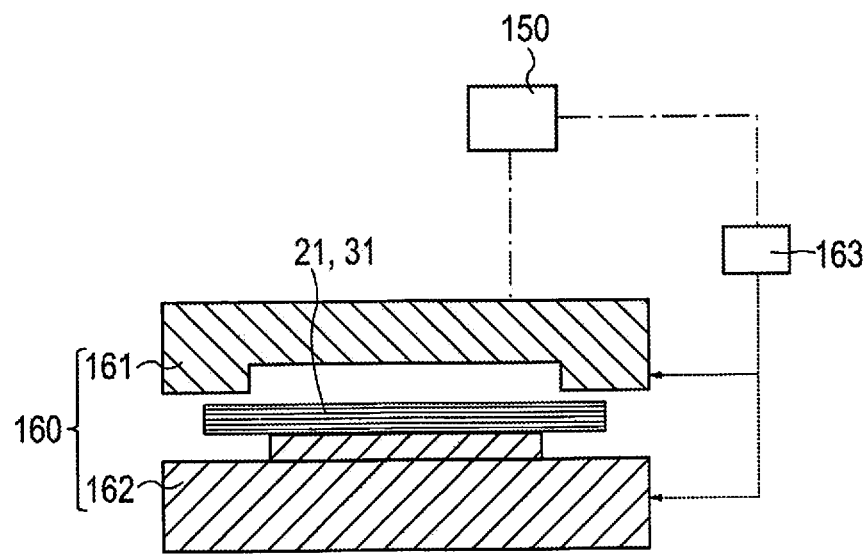
FIG. 3 is a schematic view illustrating a molding device for composite materials.

Referring to FIG. 3, a molding device 100 according to the present embodiment comprises a molding die 160 and a control unit 150 that controls the operation of the entire molding device 100.

The molding die 160 includes an upper die 161 (movable type) and a lower die 162 (fixed type), forming a pair that can be opened and closed, and a temperature adjustment unit 163 that adjusts the temperature of the upper die 161 and/or the lower die 162.

The temperature adjustment unit 163 heats the molding die 160 to a curing temperature of the base material resin 23 and to a softening temperature of the coating resin 33, heats the stacked first prepreg sheet 21 and second prepreg sheet 31, and cures the base material resin 23 of the first prepreg sheet 21. For example, the temperature adjustment unit 163 is composed of the upper die 161, a heating medium such as oil or water that circulates inside the lower die 162, and an electric heater that heats the heating medium.

The control unit 150 is composed of a memory composed of a ROM and a RAM, a CPU, and the like, and is electrically connected to the drive system of the molding die 160, the temperature adjustment unit 163, and the like, to control the operation of the entire molding device 100.

The molding method for a composite material 10 will be described below.

In the case of a hot press forming method using prepreg sheets, the resin is not injected from the outside as in the RTM molding method. In addition, since a prepreg sheet is used in all the layers, the flow of the resin inside the stacked body of prepreg sheets is relatively small, even when the resin starts to melt after placing the material inside the metal mold. Accordingly, in the case of a component for which a good appearance quality is not required, this composite material can be used without any problem. However, although the flow of the resin is relatively small, there is still a slight flow of resin. When there is a required appearance quality for the composite material, such as when applying a paint in a subsequent step, disturbance in the fibers caused by even a slight flow of the resin causes deterioration in the appearance quality. Accordingly, in the present embodiment, the composite material is formed in the following manner by means of the hot press forming method.

Figure 4:
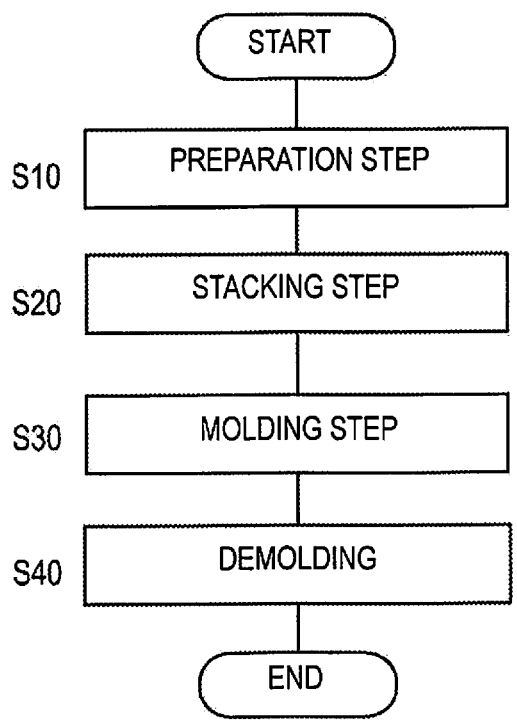
FIG. 4 is a flow chart illustrating the molding method for a composite material.

The molding method for the composite material 10 comprises a preparation step (Step S10), a stacking step (Step S20), a molding step (Step S30), and demolding (Step S40), as illustrated in FIG. 4. Each step will be described in detail below.

In the preparation step (Step S10), as shown in FIGS. 1B and 1C, the first prepreg sheet 21 in which the first reinforcing base material 22 is impregnated with the base material resin 23 and the second prepreg sheet 31 in which the second reinforcing base material 32 is impregnated with the coating resin 33 are prepared. Here, when the second prepreg sheet 31 is stacked on the first prepreg sheet 21, the amount of the coating resin 33 in the second prepreg sheet 31 is larger than the amount of the base material resin 23 in the first prepreg sheet 21, per unit volume V1, V2 including the interface 40 between the first prepreg sheet 21 and the second prepreg sheet 31. While not particularly limited, the resin content in the second prepreg sheet 31 is, for example, 50-75 wt %.

As described above, in the present embodiment, the first reinforcing base material 22 is made of long carbon fibers, and the unidirectional material 13 is used. The second reinforcing base material 32 is made of glass fiber, and the woven fabric material 12 is used. The base material resin 23 is a thermosetting resin and the coating resin 33 is a thermoplastic resin. Moreover, regarding the second prepreg sheet 31 of the outermost surface, the surface 30*a* side is brought into the so-called resin-rich state. In the embodiment, only one of the second prepreg sheets 31 is used, so this second prepreg sheet 31 corresponds to the "second prepreg sheet of the outermost surface." Accordingly, the surface 30*a* of the front surface layer 30 is the "surface of the second prepreg sheet of the outermost surface" as well as the "outermost surface."

In the stacking step (Step S20), a plurality of the first prepreg sheets 21 are stacked, and the second prepreg sheet 31 is stacked on at least a portion (upper surface in the drawing) of the surface of the first prepreg sheet 21.

Figure 5:
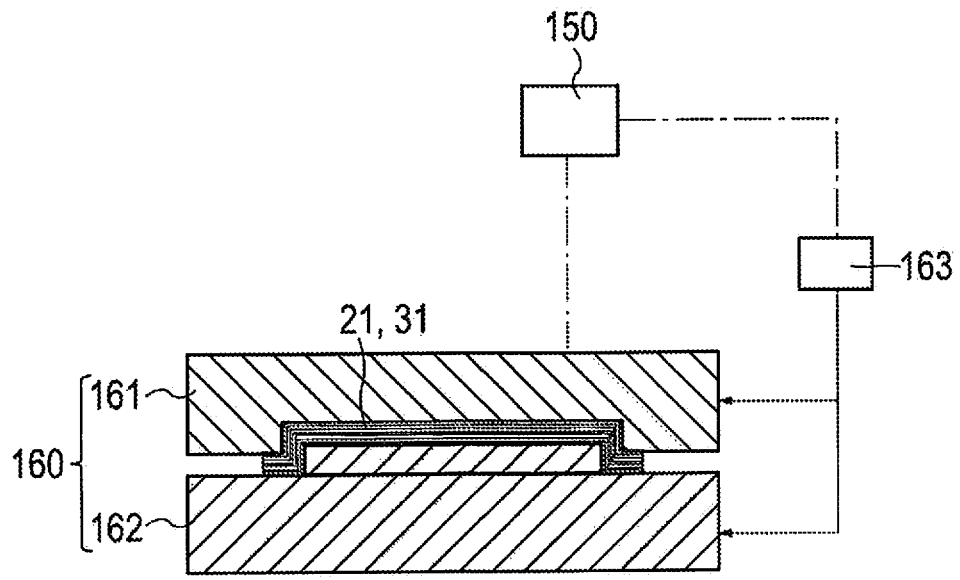
FIG. 5 is a view for explaining a procedure for molding a composite material using the molding device for composite materials, and a schematic view illustrating a molding step.

In the molding step (Step S30), the stacked first prepreg sheet 21 and second prepreg sheet 31 are placed on the lower die 162 of the molding die 160. The molding die 160 is pre-heated to a prescribed temperature by means of the temperature adjustment unit 163. The upper die 161 of the molding die 160 is closed and the stacked first and second prepreg sheets 21, 31 are subjected to hot press forming, as illustrated in FIG. 5. The upper die 161 and the lower die 162 are heated to the curing temperature of the base material resin 23 by means of the temperature adjustment unit 163 to thereby cure the base material resin 23 of the first prepreg sheet 21. The front surface layer 30 defined by the second prepreg sheet 31 is thereby integrally formed on the surface of the base layer 20 defined by the first prepreg sheet 21.

Finally, the upper die 161 of the molding die 160 is opened and the composite material 10 is demolded from the molding die 160, thereby completing the molding (Step S40).

According to the molding method for the composite material 10 of the present embodiment, the second prepreg sheet 31 is stacked on at least a portion of the surface of the first prepreg sheet 21, the first prepreg sheet 21 and the second prepreg sheet 31, which are stacked, are heated and cured, and the front surface layer 30 defined by the second prepreg sheet 31 is integrally formed on the surface of the base layer 20 defined by the first prepreg sheet 21. At this time, when the second prepreg sheet 31 is stacked on the first prepreg sheet 21, the amount of the coating resin 33 in the second prepreg sheet 31 is larger than the amount of the base material resin 23 in the first prepreg sheet 21, per unit volume V1, V2, including the interface 40 between the first prepreg sheet 21 and the second prepreg sheet 31.

According to the molding method for the composite material 10 configured in this manner, the hot press forming using the first and second prepreg sheets 21, 31 is carried out in the molding step. The first prepreg sheet 21 constituting the base layer 20 is already impregnated with the base material resin 23, so it is possible to suppress the coating resin 33 from immediately flowing into the first prepreg sheet 21 from the second prepreg sheet 31 constituting the front surface layer 30. It is possible to suppress wrinkles and kinks that occur due to the coating resin 33 and the base material resin 23 flowing together, and to suppress irregularities on the surface 30*a* of the front surface layer 30, which are formed by the first reinforcing base material 22 being impregnated with the coating resin 33. In this manner, since the surface 30*a* of the front surface layer 30 can be smoothed, it is possible to improve the appearance quality of the composite material 10.

In addition, if only the second reinforcing base material is stacked on the surface of the first prepreg sheet, or if the second prepreg sheet having a smaller resin content that the first prepreg sheet is stacked, the second reinforcing base material sucks up the base material resin. Accordingly, internal voids are generated in the first prepreg sheet, which may cause a decrease in the strength of the base layer. According to the present embodiment, when the second prepreg sheet 31 is stacked on the first prepreg sheet 21, the amount of the coating resin 33 in the second prepreg sheet 31 is set to be larger than the amount of the base material resin 23 in the first prepreg sheet 21, per unit volume V1, V2, including the interface 40 between the first prepreg sheet 21 and the second prepreg sheet 31. Accordingly, the second reinforcing base material 32 does not suck up the base material resin 23, and internal voids are not generated in the first prepreg sheet 21. It is thereby possible to improve the appearance quality of the composite material 10 and to prevent a reduction in the strength of the base layer 20.

Moreover, since the front surface layer 30 is not a layer that contributes to the product strength, it is possible to impart luster to the surface 30*a* and to further improve the appearance quality of the composite material 10, by appropriately adjusting the amount of the coating resin 33 in the second prepreg sheet 31.

Due to the fact that the amount of the coating resin 33 in the second prepreg sheet 31 is larger than the amount of the base material resin 23 in the first prepreg sheet 21, it is thought that perhaps the coating resin 33 flows into the first prepreg sheet 21, causing a so-called resin depletion and leading to deterioration of the appearance. However, since both the base layer 20 and the front surface layer 30 are composed of prepreg sheets, the difference in the resin density between the first prepreg sheet 21 and the second prepreg sheet 31 is relatively small. Accordingly, it is thought that there is relatively little movement of the resin from the front surface layer 30 to the base layer 20. Moreover, even if the coating resin 33 were to move to the base layer 20, it would suffice to impregnate the second prepreg sheet 31 with a sufficiently additional amount of resin to allow for any resin that might move. By configuring as above, the so-called resin depletion does not occur in the second prepreg sheet 31, and deterioration in the appearance of the surface 30*a* does not occur.

The composite material 10 is formed of the first and second prepreg sheets 21, 31, which include the reinforcing base materials 22, 32 and the resins 23, 33 in the uncured or semi-cured state. Compared with the RTM molding method, in which resin is injected into a reinforcing base material impregnated therewith, it is possible to shorten the molding time of the composite material. In addition, by using prepreg sheets, the unidirectional material 13 can be used; therefore, it is possible to expand the range of selectable fiber orientations.

The second reinforcing base material 32 is made of glass fiber. By using glass fiber as the reinforcing fiber, as compared to a case in which carbon fiber is used, it is possible to inexpensively form the second reinforcing base material 32, and to also inexpensively form the composite material 10.

Figure 6B:
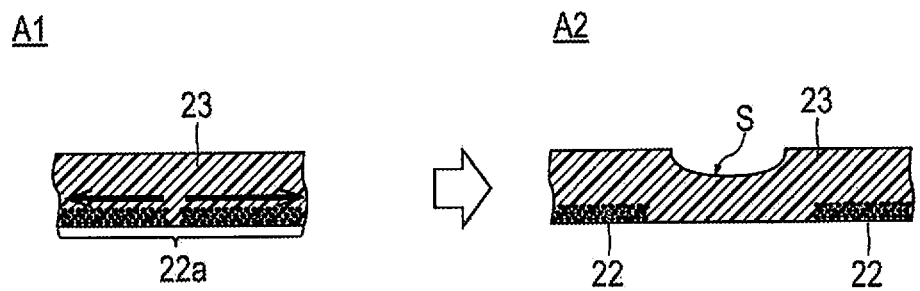
FIG. 6B is a partial cross-sectional view (left-hand) taken along the line A1-A1 line of the left-hand-hand drawing shown in FIG. 6A and a partial cross-sectional view (right-hand) taken along the line A2-A2 line of the right-hand-hand drawing shown in FIG. 6A.

In the molding step, until the base material resin 23 is cured, the base material resin 23 is softened by the heat and flows between the fibers of the first reinforcing base material 22. As shown in the left-hand drawing of FIG. 6A, if the unidirectional material 13, obtained by arranging, in the same direction, a plurality of fiber bundles 22*a*, in which a plurality of fibers are bundled, were disposed on the outermost layer of the first prepreg sheet 21, the unidirectional material 13 would have a weaker binding force in a direction orthogonal to the orientation direction of the fibers. As a result, even a slight flow of the base material resin 23 easily disturbs the orientation of the fibers, as illustrated in the right-hand drawing of FIG. 6A. In addition, due to the orientation of the fibers being disturbed, peeling occurs at the single fiber level in the fiber bundle 22a, as illustrated in the left-hand drawing of FIG. 6B. The disturbance in the fiber orientation of the first reinforcing base material 22 appears on the surface of the base layer 20 as wrinkles and kinks, and causes localized deterioration in the strength. Additionally, there are cases in which localized sinks S as that shown in the right-hand drawing of FIG. 6B occur at sites where the fibers are peeled away, thereby deteriorating the appearance quality of the surface 30a of the front surface layer 30.

Figure 7:
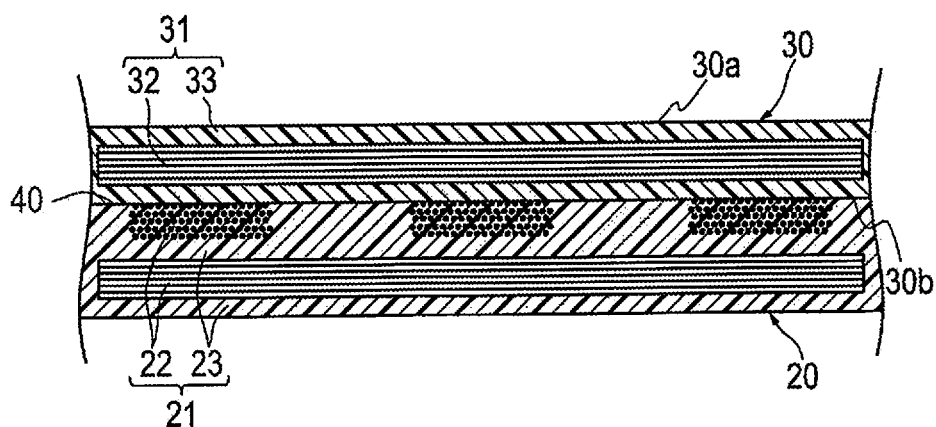
FIG. 7 is a partial cross-sectional view illustrating a state in which a second reinforcing base material, made of a woven fabric material, is pressing a first reinforcing base material.

In the present embodiment, the second reinforcing base material 32 is the woven fabric material 12 in which fibers are woven. At the time of molding, the second reinforcing base material 32, made of the woven fabric material 12, crosses the first reinforcing base material 22 and presses the first reinforcing base material 22, as illustrated in FIG. 7. As a result, it is possible to suppress the disturbance of the fibers that occurs due to flowing of the base material resin 23 in the portion where the woven fabric material 12 is disposed. Even in a case in which the unidirectional material 13 is disposed as the first reinforcing base material 22, it is possible to suppress the fibers of the unidirectional material 13 from being disturbed in the direction orthogonal to the orientation direction due to the flow of the base material resin 23 that occurs in the molding step. Accordingly, it is possible to suppress the generation of wrinkles and kinks that occur on the surface of the outermost layer of the first prepreg sheet 21, and to prevent surface irregularities caused by the fibers being peeled away. As a result, irregularities do not occur on the surface 30a of the second prepreg sheet 31, and it is possible to improve the appearance quality of the composite material 10.

Moreover, by using the woven fabric material 12 for the second reinforcing base material 32, the fiber orientation can be better controlled compared to a case in which nonwoven fabric is used; therefore, variation in the thickness of the second reinforcing base material 32 can be reduced. From this point of view as well, it is possible to obtain a smoother surface 30a of the front surface layer 30, and to improve the appearance quality of the composite material 10.

Figure 8A:
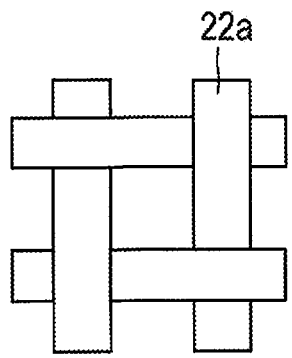
FIG. 8A is a plan view illustrating the second reinforcing base material, made of a woven fabric material.
Figure 8B:
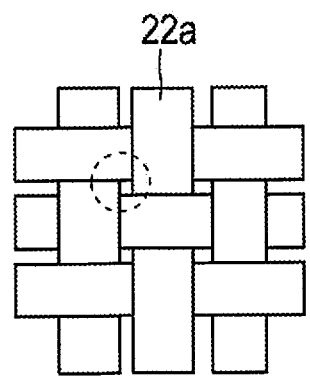
FIG. 8B is a plan view illustrating the second reinforcing base material in a case in which the basis weight of the woven fabric material (fabric weight per unit area (g/m$^2$)) is relatively large.

If the basis weight of the woven fabric material 12 (fabric weight per unit area ($g/m^2$)) is relatively large, air bubbles tend to remain in the portions where the fiber bundles 22a intersect (portion indicated by the broken line), as illustrated in FIG. 8B, and there is the risk of minute irregularities forming on the surface 30a of the composite material 10, thereby deteriorating the appearance quality.

In the present embodiment, since the front surface layer 30 is not a layer that contributes to the product strength, it is possible to make the basis weight of the woven fabric material 12 relatively small, as illustrated in FIG. 8A. Accordingly, air bubbles are not likely to remain where the fiber bundles 22a intersect, so it is possible to suppress the occurrence of minute irregularities on the surface 30a of the composite material 10 and to improve the appearance quality of the composite material 10.

The coating resin 33 is the thermoplastic resin. By disposing the thermoplastic resin, as opposed to the thermosetting resin, on the outermost layer of the composite material 10, it is possible to form a composite material 10 having superior impact resistance. In addition, since it is possible to suppress interlaminar separation and crack propagation caused by chipping, etc., it is possible to suppress the deterioration in the appearance quality when the outer panel component, to which the composite material 10 is applied, is used for a long period of time.

Moreover, the coating resin 33, which is the thermoplastic resin, is softened. The melted coating resin 33 enters into the irregularities on the surface of the base layer 20. The surface 30a becomes smooth by means of the coating resin 33 filling in the irregularities formed on the surface of the base layer 20. It is thereby possible to eliminate the irregularities on the surface of the base layer 20, to smoothen the surface 30a of the front surface layer 30, and to improve the appearance quality of the composite material 10 after painting.

Because the base material resin 23 is made of the thermosetting resin and the coating resin 33 is made of the thermoplastic resin, it can also be thought that the base material resin 23 and the coating resin 33 flow together, and that wrinkles and kinks tend to occur at the interface 40 between the thermoplastic resin and the thermosetting resin, due to differences in the viscosity and the thermal contraction rate between the thermoplastic resin and the thermosetting resin. However, since the front surface layer 30 is not a layer that contributes to the product strength, it is possible to appropriately adjust the amount of the coating resin 33 in the second prepreg sheet 31. As a result, even if the base material resin 23 is made of the thermosetting resin and the coating resin 33 is made of the thermoplastic resin, it is possible to suppress the irregularities from being formed on the surface 30a of the composite material 10, and the appearance quality of the composite material 10 will not be deteriorated.

Regarding the second prepreg sheet 31 of the outermost surface, it can be said that the amount of the coating resin 33 in the region between the outermost surface 30a and the second reinforcing base material 32 is larger than the amount of the coating resin 33 in the region between the rear surface 30b of the second prepreg sheet 31 and the second reinforcing base material 32. Since the front surface layer 30 is not a layer that contributes to the product strength, it is possible to bring the surface 30a side of the second prepreg sheet 31 into the so-called resin-rich state. By bringing the surface 30a side into the resin-rich state, it is possible to prevent irregularities on the surface 30a from being generated, and to further impart luster to the surface 30a. The appearance quality is thus improved.

The first reinforcing base material 22 is made of long carbon fibers. It is easier to make the fiber orientation uniform, as compared to a case in which short fibers are used, and in which the fiber orientations are random. Accordingly, it is possible to suppress wrinkles and kinks caused by the disturbance in the fibers, and to suppress the irregularities on the surface of the base layer 20. As a result, the appearance quality of the composite material 10 can be improved.

The first reinforcing base material 22 is the unidirectional material 13, in which the fibers are aligned in one direction. Because the fiber used for the first reinforcing base material 22 is the unidirectional material 13, the irregularities that appear on the surface of the base layer 20 decrease as compared to when the woven fabric material 12 is used. As a result of being able to suppress the irregularities on the surface of the base layer 20, it is possible to improve the appearance quality of the composite material 10.

The base material resin 23 is the thermosetting resin. In general, the thermosetting resin has higher heat resistance and superior dimensional stability than the thermoplastic resin. Therefore, it is possible to form the composite material 10 with high heat resistance and superior dimensional stability.

The composite material 10 according to the present embodiment comprises the base layer 20 including the first reinforcing base material 22 and the base material resin 23, and the front surface layer 30 including the second reinforcing base material 32 and the coating resin 33, integrally formed on at least a portion of the surface of the base layer 20. Here, the amount of the second resin 33 in the front surface layer 30 is larger than the amount of the first resin 23 in the base layer 20, per unit volume V1, V2, including the interface 40 between the base layer 20 and the front surface layer 30.

According to the composite material 10 configured in this manner, wrinkles and kinks that occur due to the coating resin 33 and the base material resin 23 flowing together are suppressed, and irregularities, which are formed by the first reinforcing base material 22 being impregnated with the coating resin 33, are not generated on the surface 30a of the front surface layer 30. In this manner, since the surface 30a of the front surface layer 30 is smooth, it is possible to provide the composite material 10 with an improved appearance quality.

Moreover, internal voids are not generated in the base layer 20, so it is possible to provide the composite material 10 with an improved appearance quality, while maintaining the strength of the base layer 20.

Moreover, since the front surface layer 30 is not a layer that contributes to the product strength, it is possible to impart luster to the surface 30a and to provide the composite material 10 with a further improved appearance quality, by appropriately adjusting the amount of the coating resin 33.

The ranges in which the coating resin 33 of the front surface layer 30 is present on the interface 40 in a cross section of the stacked base layer 20 and front surface layer 30 are larger than the ranges in which the first resin 23 of the base layer 20 is present on the interface 40, as illustrated in FIG. 2. If the cross section of the stacked base layer 20 and the front surface layer 30 is in such a state, it can be considered that in the composite material 10, "the amount of the coating resin 33 in the front surface layer 30 is larger than the amount of the base material resin 23 in the base layer 20, per unit volume V1, V2, including the interface 40 between the base layer 20 and the front surface layer 30." Moreover, regarding the second prepreg sheet 31 before molding, it can be considered that "when stacked on the first prepreg sheet 21, the amount of the coating resin 33 in the second prepreg sheet 31 is larger than the amount of the base material resin 23 in the first prepreg sheet 21, per unit volume V1, V2, including the interface 40 between the first prepreg sheet 21 and the second prepreg sheet 31."

In the cross section of the front surface layer 30, the average distance La from the surface 30a to the second reinforcing base material 32 that faces the surface 30a is greater than the average distance Lb from the interface 40 to the second reinforcing base material 32 that faces the interface 40. If the cross section of the front surface layer 30 is in such a state, it can be considered that in the composite material 10 "the amount of the coating resin 33 in the region between the surface 30a and the second reinforcing base material 32 that faces the surface 30a is larger than the amount of the coating resin 33 in the region between the interface 40 with the base layer 20 and the second reinforcing base material 32 that faces the interface 40." Furthermore, regarding the second prepreg sheet 31 before molding, it can be said that "the amount of the coating resin 33 in the region between the outermost surface 30a and the second reinforcing base material 32 is larger than the amount of the coating resin 33 in the region between a rear surface 30b of the second prepreg sheet 31 and the second reinforcing base material 32."

The molding method for the composite material 10 and the composite material 10 have been described through embodiments, but the present invention is not limited to the configuration described in the embodiment, and may be appropriately modified based on the descriptions of the Claims.

The base material resin 23 constituting the base layer 20 is not limited to the thermosetting resin, and the thermoplastic resin may be used. In this case, the molded body can be formed by closing the molding die 160 in a state in which the base material resin 23, which is the thermoplastic resin, is heated and softened, and then cooled to be cured.

The coating resin 33 constituting the front surface layer 30 is not limited to the thermoplastic resin, and the thermosetting resin may be used.

In addition, the stacked structure of the first prepreg sheet 21 and the second prepreg sheet 31 is not limited to the above-described embodiment. A mode was shown in which the second prepreg sheet 31 is stacked only on one side surface of the first prepreg sheet 21, but the second prepreg sheet 31 may be stacked on both side surfaces of the first prepreg sheet 21, and form the composite material 10 in which the front surface layer 30 is formed on both side surfaces of the base layer 20.

The invention claimed is:

1. A molding method for a composite material, the molding method comprising:
    impregnating a first reinforcing base material with a first resin to prepare a first prepreg sheet that constitutes a base layer;
    impregnating a second reinforcing base material with a second resin to prepare a second prepreg sheet that constitutes an outermost layer of the composite material, an amount of the second resin in the second prepreg sheet per unit volume being larger than an amount of the first resin in the first prepreg sheet per unit volume;
    stacking the second prepreg sheet on at least a portion of a surface of the first prepreg sheet; and
    heating and curing the first prepreg sheet and the second prepreg sheet, which are stacked, such that the outermost layer of the composite material defined by the second prepreg sheet is integrally formed on a surface of the base layer defined by the first prepreg sheet,
    the first resin being a thermosetting resin and the second resin being a thermoplastic resin, and
    a content of the second resin in the second prepreg sheet ranging from 50 wt % to 75 wt % relative to a total weight of the second prepreg sheet.

2. The molding method according to claim 1, wherein the second reinforcing base material is made of glass fiber.

3. The molding method according to claim 1, wherein the second reinforcing base material is a woven fabric material in which fibers are woven.

4. The molding method according to claim 1, wherein in the second prepreg sheet, an amount of the second resin in a region between an outermost surface of the second prepreg sheet and the second reinforcing base material is larger than an amount of the second resin in the region between a rear surface of the second prepreg sheet and the second reinforcing base material, the rear surface of the second prepreg sheet being opposite the outermost surface of the second prepreg sheet.

5. The molding method according claim 1, wherein the first reinforcing base material is made of long carbon fibers.

6. The molding method according to claim 1, wherein the first reinforcing base material is a unidirectional material in which fibers are aligned in one direction.

7. A composite material comprising:
a base layer comprising a first prepreg sheet, the first prepreg sheet including a first reinforcing base material impregnated with a first resin; and
an outermost layer of the composite material comprising a second prepreg sheet, the second prepreg sheet including a second reinforcing base material impregnated with a second resin, the outermost layer of the composite material being heated and cured with the base layer such that the outermost layer is integrally formed on a surface of the base layer,
the first resin being a thermosetting resin and the second resin being a thermoplastic resin,
a content of the thermoplastic resin in the outermost layer ranging from 50 wt % to 75 wt % relative to a total weight of the outermost layer,
an amount of the thermoplastic resin in the second prepreg sheet per unit volume being larger than an amount of the thermosetting resin in the first prepreg sheet per unit volume, and
the base layer containing the thermosetting resin being in direct contact with the outermost layer containing from 50 wt % to 75 wt % of the thermoplastic resin.

8. The composite material according to claim 7, wherein within a region that includes a boundary between the base layer and the outermost layer of the composite material, the amount of the second resin in the outermost layer of the composite material is larger than the amount of the first resin in the base layer with respect to a cross section in which the base layer and the outermost layer of the composite material are stacked.

9. The composite material according to claim 7, wherein the second reinforcing base material is made of glass fiber.

10. The composite material according to claim 7, wherein the second reinforcing base material is a woven fabric material in which fibers are woven.

11. The composite material according to claim 7, wherein in the outermost layer of the composite material, an amount of the second resin in a region between an outermost surface of the outermost layer of the composite material and the second reinforcing base material facing the outermost surface of the outermost layer of the composite material is larger than an amount of the second resin in a region between a boundary between the outermost layer of the composite material and the base layer and the second reinforcing base material that faces the boundary.

12. The composite material according to claim 11, wherein
an average distance from the outermost surface of the outermost layer of the composite material to the second reinforcing base material that faces the outermost surface of the outermost layer of the composite material is greater than an average distance from the boundary to the second reinforcing base material that faces the boundary with respect to a cross section of the outermost layer of the composite material.

13. The composite material according to claim 7, wherein the first reinforcing base material is made of long carbon fibers.

14. The composite material according to claim 7, wherein the first reinforcing base material is a unidirectional material in which fibers are aligned in one direction.

15. The molding method according to claim 1, wherein the first reinforcing base material is a unidirectional material or a woven fabric material.

16. The composite material according to claim 7, wherein the first reinforcing base material is a unidirectional material or a woven fabric material.

17. The molding method according to claim 1, wherein a first surface of the second prepreg sheet is in contact with the base layer and a second surface of the second prepreg sheet opposite the first surface is a first outermost surface of the composite material, the second prepreg sheet includes a first region that is closer to the first surface and a second region that is closer to the second surface, and the content of the second resin in the second prepreg sheet is higher in the second region than in the first region.

18. The composite material according to claim 7, wherein a first surface of the second prepreg sheet is in contact with the base layer and a second surface of the second prepreg sheet opposite the first surface is a first outermost surface of the composite material, the second prepreg sheet includes a first region that is closer to the first surface and a second region that is closer to the second surface, and the content of the second resin in the second prepreg sheet is higher in the second region than in the first region.

* * * * *